(12) United States Patent
Sinn et al.

(10) Patent No.: US 6,296,381 B1
(45) Date of Patent: Oct. 2, 2001

(54) INSIDE LIGHT MODULE WITH A RAIN SENSOR

(75) Inventors: Alexandra Sinn, Schontal; Heiner Bayha, Oberriexingen; Warner Philipps, Ludwigsburg, all of (DE)

(73) Assignee: Itt Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/381,477

(22) PCT Filed: Mar. 19, 1998

(86) PCT No.: PCT/EP98/01625

§ 371 Date: Sep. 16, 1999

§ 102(e) Date: Sep. 16, 1999

(87) PCT Pub. No.: WO98/43852

PCT Pub. Date: Oct. 8, 1998

(30) Foreign Application Priority Data

Mar. 19, 1997 (DE) .............................. 197 11 374

(51) Int. Cl.[7] ....................................... B60Q 1/26
(52) U.S. Cl. ............................ 362/503; 362/464; 362/802
(58) Field of Search .................................. 362/276, 464, 362/488, 503, 802, 29

(56) References Cited

U.S. PATENT DOCUMENTS 4,871,917   10/1989   O'Farrell et al. .

FOREIGN PATENT DOCUMENTS 43 29 983   9/1993   (DE) .

*Primary Examiner*—Sandra O'Shea
*Assistant Examiner*—John Anthony Ward
(74) *Attorney, Agent, or Firm*—J. Gordon Lewis

(57) ABSTRACT

The invention relates to an inside light module for motor vehicles. The invention provides a rain sensor that can be easily installed inside the motor vehicle. This is achieved by connecting the rain sensor to the inside light module and by securing the inside light module and the rain sensor at the same time. Useful embodiments involve electrical connection of the rain sensor and appropriate placement of the rain sensor on the windscreen of the motor vehicle.

16 Claims, 2 Drawing Sheets

INSIDE LIGHT MODULE WITH A RAIN SENSOR

BACKGROUND OF THE INVENTION

The invention pertains to an inside light module or a motor vehicle which is preferably mounted within the roof region of the motor vehicle. This inside light module is connected to electrical wires that extend through the motor vehicle. The inside light module forms a unit that is mounted in the motor vehicle near the upper edge of the windshield.

Rain sensors are known which adjoin the inner surface of the windshield within the region swept by the windshield wipers. Rain sensors of this type adapt the control of the windshield wiper system to the degree of wetness of the windshield to be wiped. It is disadvantageous that such rain sensors must be arranged within the region of the windshield that is swept by the windshield wipers and are thus quite visible to the driver. In addition, the sensor also must be connected to electrical wires in order to exchange information with the windshield wiper system and to be driven by the power supply, said electrical wires extending over parts of the windshield. The attempt was made to protect the sensor from coming into contact with passengers by installing the sensor into the base of the rearview mirror, but this resulted in the unsightly appearance of connecting wires that extend over the windshield to the rain sensor.

The invention is based on the objective of attaining a suitable solution for arranging a rain sensor within the region of the windshield such that a pleasing appearance is achieved and the mounting of the rain sensor can be simplified.

SUMMARY OF THE INVENTION

The invention, in principle, proposes to design the inside light module in such a way that the arrangement of the rain sensor on the windshield can be improved. For this purpose, the inside light module is provided with a projection that serves for covering the rain sensor arranged on the windshield once the inside light module is installed in the motor vehicle. The projection covers the rain sensor as well as its supply wires on the side of the passenger compartment, wherein the projection may simultaneously form a protection for the detectors of the sensor, its electronic circuit, and the required supply wires. One particularly advantageous option consists of a relatively narrow design for the projection, wherein the projection is arranged behind the rearview mirror mounted on the inside light module in such a way that the entire assembly does not hinder the view through the windshield. The thus formed heel of the inside light module may also be designed so that it presses the rain sensor against the windshield once it is installed in the motor vehicle, i.e., a superior coupling of the radiation emitted by the rain sensor with the windshield is ensured. In this case, the rain sensor is not rigidly connected to the windshield, but rather held by the heel or projection of the inside light module. The heel itself may have a certain prestress that presses it against the windshield. However, it would also be conceivable to provide spring devices that press the sensor against the windshield with a highly constant force in fatigue-proof fashion as described further below.

One particularly practical embodiment of the inside light module for mounting the rain sensor utilizes the fact that the inside light module as well as the sensor contains electrical connections, i.e., the power supply leading to the inside light within the module may also serve to drive the rain sensor. This may be realized by means of internal connections within the module. Besides the rain sensor, the inside light module may also be provided with controls, e.g., a control for the sunroof, a remote-control for the power locks of the motor vehicle, a control for the dashboard lighting or a warning display for indicating that the lights are turned on. The module itself may also be provided with plug connections for the rain sensor such that the rain sensor is connected to the corresponding electrical connections when it is plugged into the inside light module. However, a combination of characteristics also includes embodiments in which the connections of the rain sensor as well as the connections of the inside light extend to a common terminal panel. In this case, both components are supplied with power by means of only one plug connection, and the rain sensor and/or the inside light module are also able to exchange information with the windshield wiper control via the terminal panel. With respect to the rain sensor, it is important that its radiant energy reach a region on the outer surface of the windshield which is swept by the wiper blades. This means that the heel must extend correspondingly far downward. Since the uppermost point on the windshield reached by most wiper blades usually lies outside the axis of symmetry of the windshield, it may be practical to place the heel outside the central axis of the motor vehicle, i.e., further toward the side of the driver or the passenger, depending on the given requirements. Since good visibility for the driver is usually the decisive factor, the heel is preferably arranged offset relative to the driver's side of the vehicle.

In order to simplify the installation of the rain sensor in the motor vehicle, the invention proposes to utilize a combination of characteristics in which the rain sensor is already arranged within the light module such that the inside light module and the rain sensor are mounted simultaneously. This also applies to the plug connection of the inside light module which simultaneously realizes connection of the rain sensor.

As described previously, the rain sensor may be pressed against the windshield in this case due to the prestress of the heel. In another solution, a spring device presses the rain sensor that is arranged within the inside light module so that it can be moved toward and against the windshield. In this case, for example, the receptacle may be designed in such a way that the sensor is movably arranged in the receptacle by means of locking elements, whereby the sensor cannot be lost during the transport of the inside light module due to the locking elements.

The inside light module may also accommodate additional components, e.g., switches for turning the interior light on and off, a pivoting inside mirror, and displays, for example, for displaying control statuses or switching conditions and the like. The mounting devices for the inside light module may be arranged in such a way that the inside light module can be mounted on the inside roof lining or on a face plate that is located above the windshield and connected to the roof of the motor vehicle by means of welding.

In summary, the invention and its advantages can be described as follows.

The integration of the rain sensor and the inside light module is particularly suitable for motor vehicle concepts in which the inside mirror is mounted in the roof. If the housing of the inside light module is realized such that it covers the windshield from the inside within the region located behind the inside mirror, a rain sensor can be arranged behind this cover. In this case, the cover must extend downward on the windshield to such an extent that the sensor is located on the windshield within the region swept by the windshield wipers. The rain sensor is mechanically fixed in the inside light cover and pressed against the windshield when mounting the inside light module against the inside roof lining.

The mechanical arrangement for fixing the rain sensor is integrated into the housing of the inside light module, wherein the receptacle is equipped with a spring element that presses the sensor against the windshield and thus ensures the optical coupling between the sensor and the windshield.

The wiring of the rain sensor may be hidden within the housing of the inside light module. In this respect, a direct plug connection between the rain sensor and the housing of the inside light module would also be conceivable.

The advantages of the integration of the rain sensor into the inside light module are described below:

The rain sensor is premounted and fixed in position. The wiring and the plug connections can be tested by the vendor, and the wiring expenditure on the assembly line as well as the steps required for the mounting process can be reduced. The driver's vision is not hindered by the rain sensor because the rain sensor is arranged behind the inside mirror.

It is no longer necessary to bond the rain sensor to the windshield because the optical coupling is realized by pressing the sensor against the windshield with the spring element arranged in the housing of the inside light module. In addition, a possibly required replacement of the windshield is simplified.

BRIEF DESCRIPTION OF THE DRAWINGS

An embodiment of the invention is described below with reference to the figures which show

DESCRIPTION OF THE PREFERRED EMBODIMENTS

Figure 1:
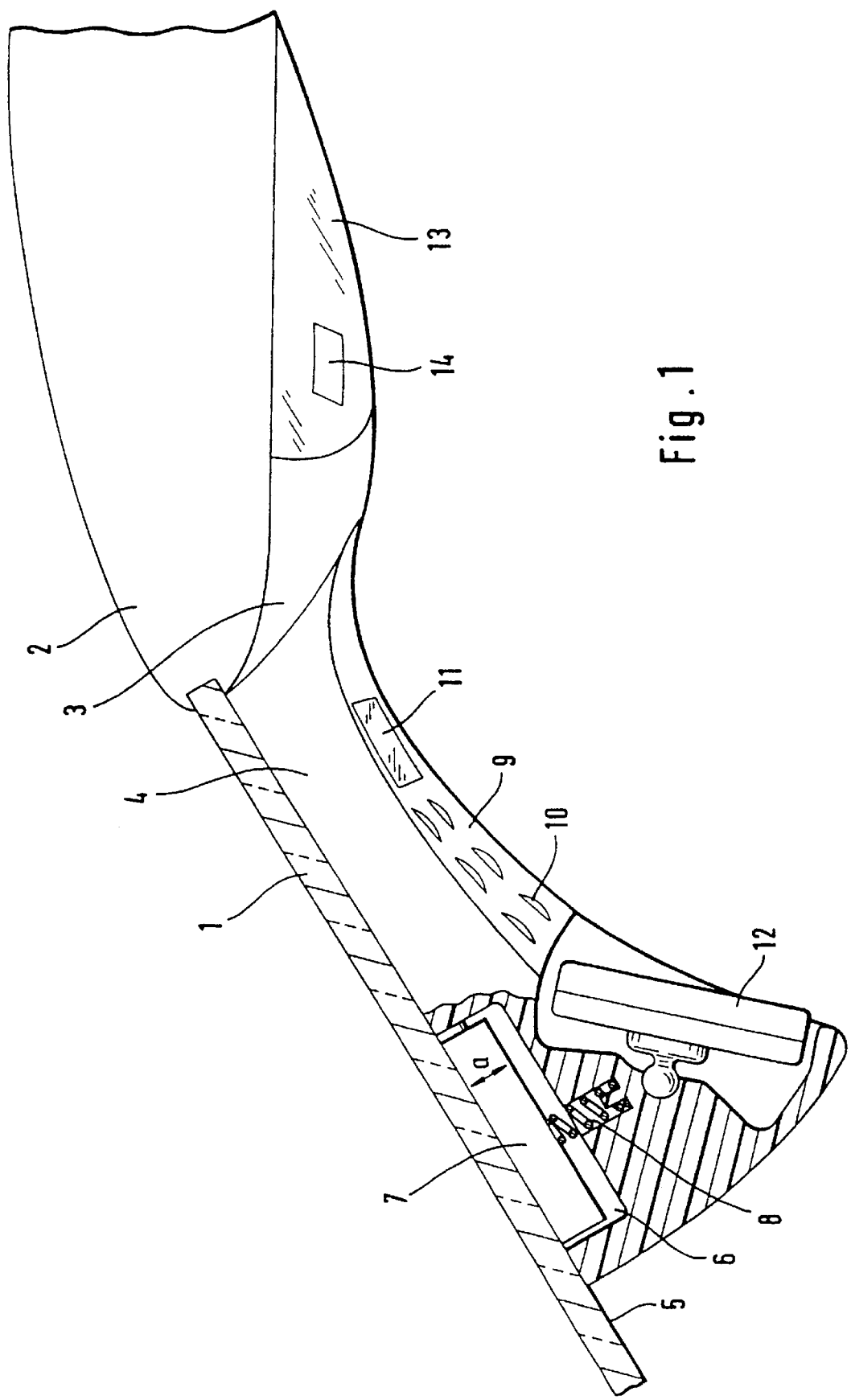
FIG. 1 is a partially cross sectioned side elevational view of a first embodiment of the invention.

In FIG. 1, a windshield 1 is conventionally connected to the roof 2 of a motor vehicle. The component 2 shown in FIG. 1 may consist of the sheet metal of the motor vehicle roof or the inside roof lining attached to the roof of the motor vehicle. The inside light module 3 is mounted to the roof 2 and the respective interior roof lining. The type of mounting is not the object of the invention and may be realized conventionally. A projection that is realized in the form of a narrow heel 4 protrudes from the inside light module 3. This heel 4 adjoins the inner surface 5 of the windshield 1. The heel 4 has a receptacle opening 6 in which a rain sensor 7 is arranged such that it can be moved perpendicular to the inner surface 5 of the windshield in the direction of the arrow a. A spring 8 that may be realized in the form of a flat coil spring, a leaf spring, or another type of spring element is braced on the bottom of the receptacle opening 6 and suitably presses the rain sensor 7 against the interior surface 5 of the windshield 1.

Actuating elements 10 of switches or a display 11 may also be arranged on the surface 9 of the module 3. The inside light module 3 is also able to accommodate a mirror 12 that is pivotably mounted in the inside light module 3 and serves as a rearview mirror or inside mirror. The inside light module 3 is also equipped with an inside light 13 that may also include one or more spotlights 14. FIG. 1 shows a simplified view of the inside light module 3. Here, the inside light module 3 extends toward the observer within the region of the roof and is sectioned at this location. However, the heel 4 extends below the plane of the section, but is illustrated in sectioned fashion at its lower end in order to illustrate the guidance of the rain sensor 7.

Figure 2:
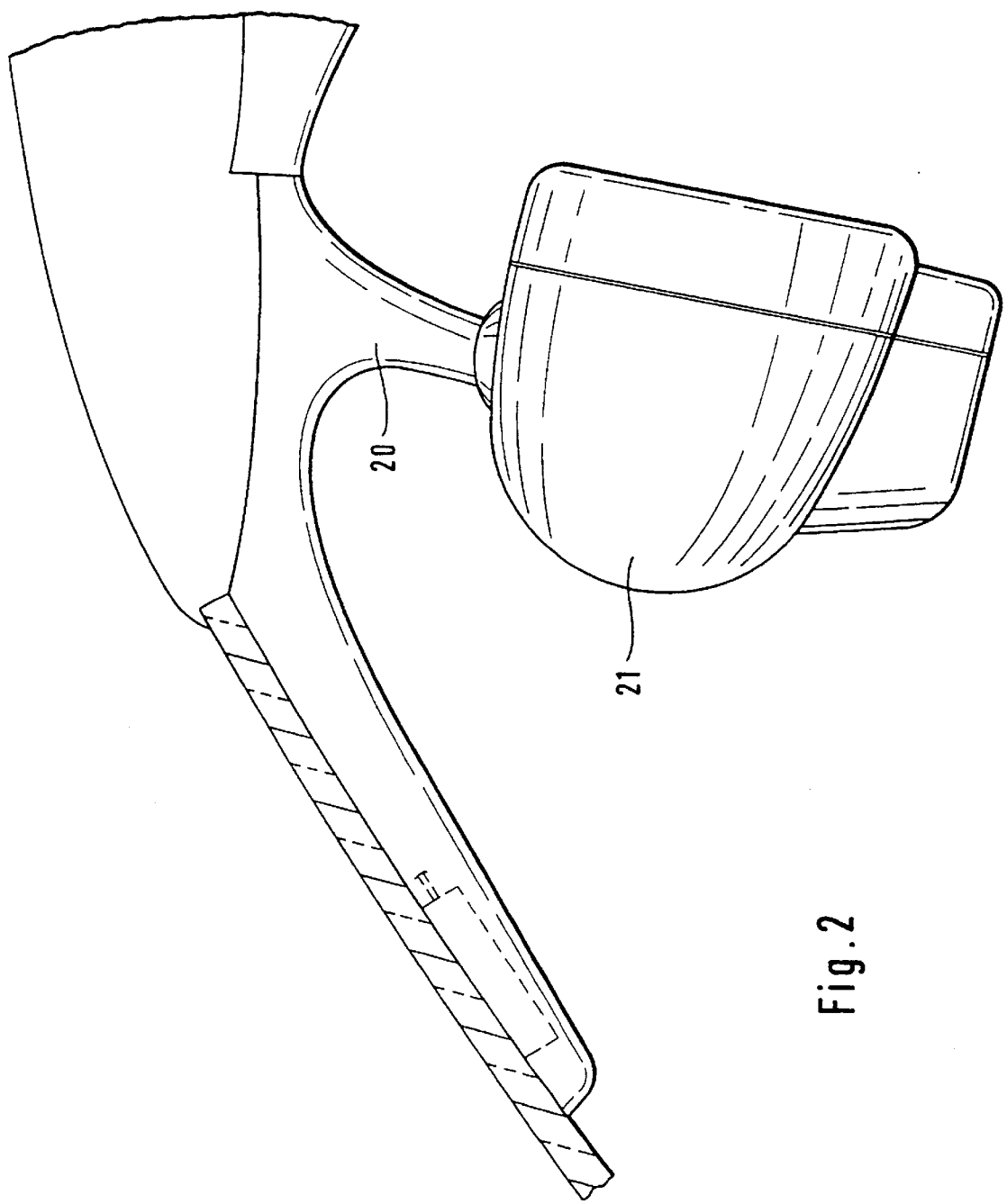
FIG. 2 is a side elevational view of a second embodiment of the invention.

FIG. 2 shows a slightly modified embodiment of the inside light module according to the invention. The essential difference can be seen in the fact that a housing 21 which may carry the mirror and/or the spotlight is held by means of an arm 20. The most important aspect of the invention is that the inside light module accommodates the rain sensor, i.e., the inside light module and the rain sensor can be mounted simultaneously.

What is claimed is:

1. An inside light module, characterized in that the inside light module is adapted to be mounted on the inside roof lining of a motor vehicle and is provided with a projection that points in the direction of a windshield when installed, wherein a rain sensor is accommodated in the projection of the inside light module in a narrow heel, the heel pressing the side of the sensor which carries detectors against the inner surface of the windshield under prestress when the inside light module is installed.

2. The inside light module according to claim 1, characterized by a terminal panel for connecting connections of the inside light module with electrical wires that extend through the motor vehicle, wherein connections that lead to the rain sensor as well as to an inside light are provided on the terminal panel.

3. The inside light module according to claim 2, characterized in that at least one of the connections are assigned to the exchange of information between the rain sensor and other components of the motor vehicle, and by the fact that other connections are assigned to the power supply of the rain sensor and the inside light and the exchange of information between the inside light module and other components of the motor vehicle.

4. The inside light module according to claim 1, characterized in that the heel has such a length that its free end section which carries the rain sensor protrudes into a region of the windshield that is swept by the wiper blade of the windshield wiper system on the opposite side of the windshield.

5. The inside light module according to claim 1, characterized in that the heel is provided with a receptacle opening, in which the rain sensor is fixed so that it is open toward the windshield.

6. The inside light module according to claim 5, characterized in that the rain sensor can be moved perpendicularly to the windshield in the receptacle opening, and a spring device prestresses the rain sensor in the direction of movement toward the windshield.

7. The inside light module according to claim 1, characterized in that at least one of a mirror, a display and at least one switch is mounted on the module in addition to the rain sensor.

8. The inside light module according to claim 1, characterized in that a mirror is pivotally mounted on the module in addition to the rain sensor.

9. The inside light module according to claim 1, characterized in that at least one of a display and at least one switch is mounted on the module in addition to the rain sensor.

10. An inside light module, characterized in that the inside light module is adapted to be mounted on the inside roof lining of a motor vehicle and is provided with an inside light and a projection that points in the direction of a windshield when installed, wherein a rain sensor is accommodated in the projection of the inside light module in a narrow heel, the heel pressing the side of the sensor which carries detectors against the inner surface of the windshield under prestress when the inside light module is installed.

11. The inside light module according to claim 10, characterized by a terminal panel for connecting connections of the inside light module with electrical wires that extend through the motor vehicle, wherein connections that lead to the rain sensor as well as to the inside light are provided on the terminal panel.

12. The inside light module according to claim 10, characterized in that the heel is provided with a receptacle opening, in which the rain sensor is fixed so that it is open toward the windshield.

13. The inside light module according to claim 10, characterized in that the rain sensor can be moved perpendicularly to the windshield in the receptacle opening, and a spring device prestresses the rain sensor in the direction of movement toward the windshield.

14. The inside light module according to claim 10 characterized in that at least one of a mirror, a display and at least one switch is mounted on the module in addition to the rain sensor.

15. The inside light module according to claim 10 characterized in that a mirror is pivotally mounted on the module in addition to the rain sensor.

16. The inside light module according to claim 10 characterized in that at least one of a display and at least one switch is mounted on the module in addition to the rain sensor.

* * * * *